No. 665,973.
W. A. PATTERSON.
METHOD OF MAKING BLOCKS OF FUEL.
(Application filed July 16, 1900.)
Patented Jan. 15, 1901.
(No Model.)
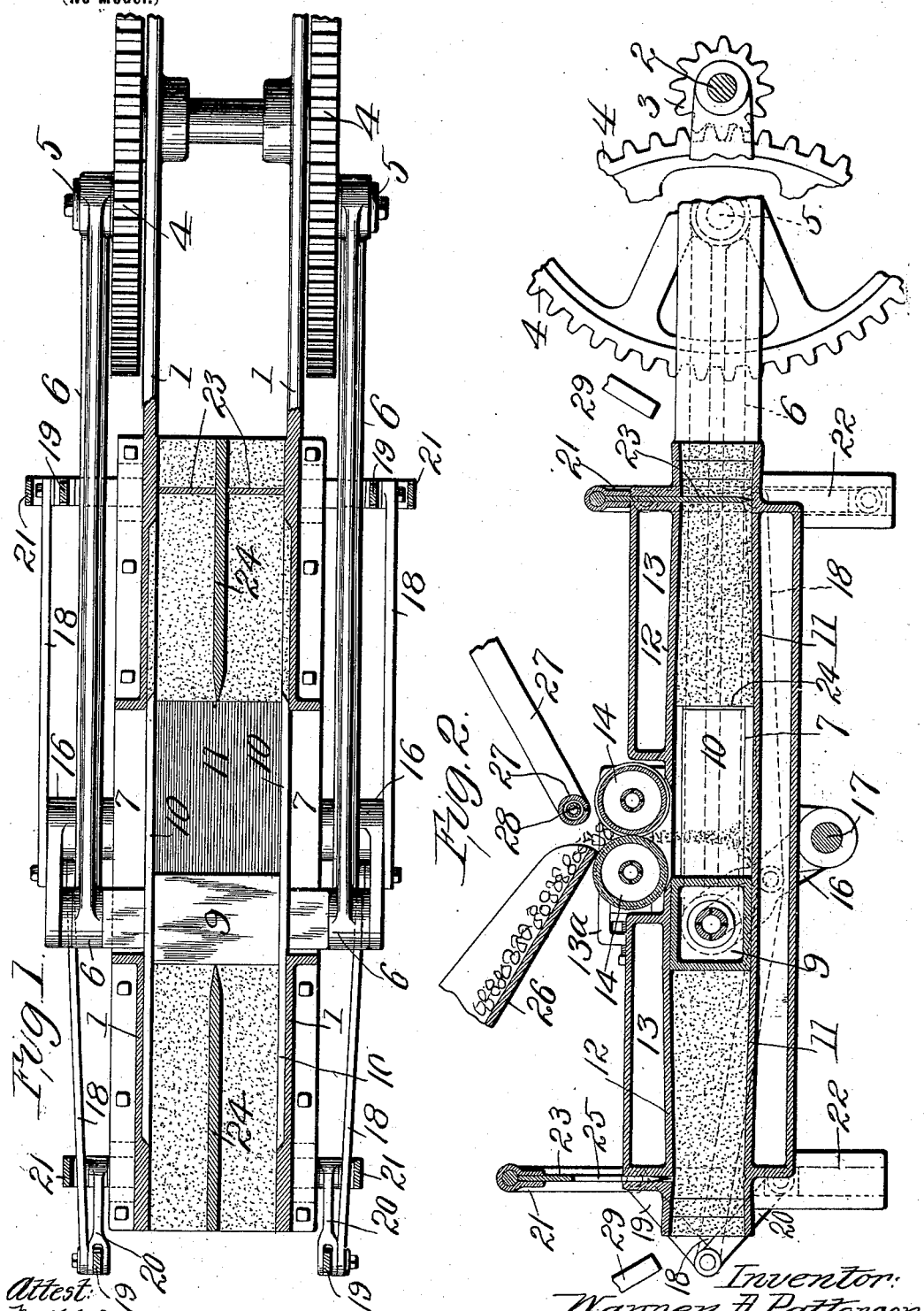

UNITED STATES PATENT OFFICE.

WARREN A. PATTERSON, OF DALLAS, TEXAS, ASSIGNOR OF THREE-FIFTHS TO JOSEPH A. SOLOMON, OF NEW YORK, N. Y., AND MERIDETH A. SULLIVAN, CHARLES L. SANGER, DANIEL WEIL, ALEXANDER WEIL, AND DANIEL WISE, OF WACO, TEXAS.

METHOD OF MAKING BLOCKS OF FUEL.

SPECIFICATION forming part of Letters Patent No. 665,973, dated January 15, 1901.

Application filed July 16, 1900. Serial No. 23,746. (No specimens.)

*To all whom it may concern:*

Be it known that I, WARREN A. PATTERSON, a citizen of the United States, residing at the city of Dallas, county of Dallas, State of Texas, have invented a certain new and useful Improvement in Methods of Making Blocks of Fuel, of which the following is a full, clear, and exact description, such as will enable others skilled in the art to which it appertains to make and use the same, reference being had to the accompanying drawings, forming part of this specification, in which—

Figure 1 is a horizontal sectional view through an approved form of apparatus for carrying out my invention, and Fig. 2 is a vertical sectional view through the same.

This invention relates to a new and useful method of making blocks of fuel, the object being to intimately mix and combine solid and liquid ingredients in such manner and proportions that the resultant block is highly combustible, compact, and practically impervious to moisture.

With this object in view the invention consists in the method hereinafter described for producing blocks of fuel.

In the drawings I have shown an apparatus for carrying out my invention, said apparatus forming the subject-matter of a companion application filed of even date herewith and serially numbered 23,745. I will describe the structure of this apparatus here; but I do not wish to be limited to the details and arrangement of the parts as shown and described, because other machines might be made for carrying out my method.

The product resulting from the practice of the method herein described forms the subject-matter of a separate application filed by me of even date herewith, serially numbered 23,747.

In the drawings, 1 indicates two side frames, preferably in the form of castings, said frames carrying a shaft 2 at one of their extremities, upon which shaft are mounted pinions 3 in mesh with gears 4. These gears carry wrist-pins 5, upon which are mounted pitmen 6. The side frames are provided with suitable openings 7, in which operates the cross-head carrying a plunger 9, operating, preferably, between the frames. In order to close the opening 7 during the entire movement of the plunger in either direction, I prefer to arrange plates 10 on the plunger, which operate in suitable guideways on the inner faces of the side frames, as shown in Fig. 1.

11 indicates the bottom plate, which is mounted between the side frames, said bottom plate being preferably chambered for the introduction of steam or hot water for purposes which will hereinafter be described. This bottom plate is preferably formed with a horizontal face throughout the length of stroke of the plunger, the ends of said plate being inclined upwardly from the horizontal portion in order that the material to be compressed will be subjected to a gradual pressure by the plunger. However, these ends may be straight or on the same plane as the middle portion of the plate, in which event a greater inclination should be given to the top plate.

12 indicates the top plate, whose central portion is parallel to the central portion of plate 11 throughout the entire stroke of the plunger, the ends of said top plate inclining downwardly, as before described, or being on the same plane as the middle, in which event a greater inclination should be given to the ends of the bottom plate. In the construction shown the ends of both the top and bottom plates gradually converge to form a contracted mouth, the material being piled up and compressed between said plates, and as said material is forced to travel outwardly the converging top and bottom plates subject it to greater pressure. The top plate is preferably formed with chambers 13 at its ends for the reception of steam or hot water, whose heat is radiated to the material being operated upon, so that said material is kept at a high temperature during the time it is in the machine. I will also state that the plunger 9 is preferably made hollow to form a steam or hot-water chamber, as shown in Fig. 2, suitable pipe connections being arranged to conduct steam or hot water to and from these several chambers, said pipe connections not appearing upon the drawings, but being well understood.

The top plate 12 carries slotted frames 13ᵃ on each side, in which are mounted suitable boxes affording bearings for rollers 14. These rollers are preferably made hollow and kept heated by steam or hot water. I prefer to circumferentially corrugate the peripheries of these rollers, but the same may be corrugated longitudinally. Gears (not shown) mounted on the axles of the rollers mesh with each other and drive said rollers in opposite directions, so as to crush the material delivered therebetween and force it into the machine. Any suitable power may be employed to drive one or the other of the rollers 14.

16 indicates crank-arms mounted on a rock-shaft 17, preferably extending transversely under the machine, said crank or rock arms being slotted at their outer ends to receive the trunnions of the plunger, whereby when said plunger is vibrated said crank-arms will be rocked coincidently therewith.

18 indicates links connected to the crank-arm 16 at their inner ends, their outer ends being connected to toggle-levers 19 and 20, the former of which has fixed pivot-points, while the latter are pivotally connected to vertically-movable frames 21, mounted in suitable guideways 22, (said guideways being formed in the outer faces of the legs of the side frames.) These vertically-movable frames 21 carry knife-blades 23, which pass through suitable openings in the top plate and serve to sever the compressed material into blocks as it issues from the machine.

24 indicates blades suitably secured between the top and bottom plates at the ends of the machine and beyond the path of the plunger. The cutting edges of these blades are at their inner ends and terminate at the stopping-point of the plunger in its stroke, while the outer ends of these blades preferably extend to the extremities of the top and bottom plates. As shown in the drawings, the vertically-movable knives 23, which sever the material transversely, are slotted at 25 to receive the knife-blades 24.

26 indicates the end of a chute leading from some source of solid-fuel supply, said fuel being supplied on said chute to be delivered to the rollers 14 in given quantities. At some convenient point, preferably above the compressor, I arrange a tank (not shown) in which the liquid combustible is heated and mixed if composed of more than one ingredient, said tank being tapped by looped pipe 27, whose connecting or cross member is preferably perforated above one of the rollers 14 to deliver the liquid combustible onto said roller, so that the liquid is fed into the machine with the crushed material.

To keep the liquid combustible hot, I arrange a steam or hot-water pipe 28 in the pipe 27, as shown in Fig. 2. This liquid combustible preferably consists of a mixture composed of thirty-two parts resin, two parts cedar-tops, and one part petroleum, the cedar-tops being broken from the tops and extremities of the branches of cedar-trees and introduced into the melted resin and boiled. The object in introducing the cedar-tops is not so much for the purpose of extracting the resinous and combustible substance therefrom as it is to impart a glaze to the resin and petroleum, rendering the same susceptible of being congealed more quickly after the fuel passes from the machine.

The pipe 29 is preferably arranged to deliver a blast of cold air onto the fuel issuing from the discharge ends of the machine in order to congeal the liquid ingredient, and as the blocks are forced beyond the machine I prefer to arrange a traveling belt for receiving said blocks and conducting them to some suitable point.

In operation the device illustrated in the accompanying drawings is designed to receive the corncobs directly from the corn-shelling machine, an interposed feeding device being provided to prevent the cobs crowding the fuel-compressor, said feeding device serving to equalize the feed to the compressor. As the cobs pass between the rollers 14 they are crushed and at the same time forced into contact with the liquid combustible supplied from the pipe 27. The proportion of this liquid-supply is in volume about one to three—that is, the pressed fuel contains in volume about one part of the liquid combustible and in volume three parts solid, in this instance corncobs. This mass, both liquid and solid material, passing between the rollers 14 falls to one side or the other of the plunger 9, that falling on top of the plunger being scraped off by the edges of the top plate. The links 18 are disconnected, so as to permit the knives 23 to remain in their lower position until the plunger builds up the fuel at each end of the machine and compresses said fuel into a compact mass. The links are now connected to the rock-arm 16, and at each movement of the plunger the material which is piled up in advance thereof is added to the mass of material at the ends of the machine. By giving to the top and bottom plates the proper inclination the fuel can be compressed to the extent desired, the compression at each extremity of movement of the plunger occurring when the knives 23 are raised, so that the material after being compressed by the inclined top and bottom plates passes beyond said knives, and as the plunger recedes from the elevated knife said knife descends and severs the compressed material, this operation occurring at each end of the machine. The gradual compression of the fuel and the length of time it takes the fuel to pass through the machine after being introduced thereinto enable the liquid ingredient to thoroughly saturate the solid, the contraction of the top and bottom plates at the discharge ends of the machine forcing the liquid and solid ingredients more intimately together and making the mass more compact. When the blast of cold air congeals the liquid material on the surface of the severed blocks, it enables said blocks to be handled and packed, the reduction of temperature in the blocks being augmented by causing said blocks to travel some distance along a conveyer-belt, upon which they lose their heat.

While I have shown a double-ended machine in the drawings—to wit, one in which the material is compressed and discharged at each end—it will be obvious that by interrupting the feed of material to the machine during that period of time that the plunger is moving in one direction the plunger can be made to press only in one movement. Such a single machine would of course have but one-half the capacity of the machine shown in the drawings.

The above description applies to the machine shown in the accompanying drawings and also to the machine shown in the companion application before referred to. In practicing my improved method by the use of this machine the solid material is first crushed and during the crushing period is in contact with the liquid ingredient which it absorbs when expanding after passing through the crushing-rolls. The crushed mass, composed of the cold solid material and the heated liquid, is permitted to remain stationary for a short period of time and is heated, after which it is banked against the mass to be compressed. In the mass the solid and liquid ingredients are gradually compressed, moving in one direction by the action of the plunger and compressed at right angles to such movement by the inclined walls, which results in packing the ingredients more closely together. At each impaction of the plunger more material is added to the mass and the particles of material throughout the whole mass are moved, so that during the compression the liquid ingredient is absorbed by the solid material and forced into the interstices, so as to make substantially a solid block of fuel free of air-holes when the block is formed by the severing-knives at the end of the machine.

Having thus described my invention, what I claim, and desire to secure by Letters Patent, is—

1. The herein-described method of making blocks of fuel which consists in first crushing the solid combustible in the presence of a heated liquid combustible, then compressing the two gradually while in a heated condition, so as to force the liquid ingredient throughout the mass, and finally shaping the mass into blocks and cooling said blocks for the purpose of congealing the liquid ingredient; substantially as described.

2. The herein-described method of making blocks of fuel, the same consisting in crushing a solid combustible in the presence of a heated liquid combustible, then compressing the two gradually while in a heated condition, adding other material thereto by impaction so as to deprive the mass of air and force the heated liquid ingredient into and around the solid combustible, shaping the mass into blocks, and, finally, cooling the blocks to congeal the liquid ingredient; substantially as described.

In testimony whereof I hereunto affix my signature, in the presence of two witnesses, this 11th day of July, 1900.

WARREN A. PATTERSON.

Witnesses:
WM. H. SCOTT,
A. S. GRAY.